UNITED STATES PATENT OFFICE.

HUGO WOLFF, OF LUDWIGSHAFEN-ON-THE-RHINE, GERMANY, ASSIGNOR TO BADISCHE ANILIN & SODA FABRIK, OF LUDWIGSHAFEN-ON-THE-RHINE, GERMANY, A CORPORATION.

GREEN ANTHRACENE DYES AND PROCESS OF MAKING THE SAME.

995,936.

Specification of Letters Patent. Patented June 20, 1911.

No Drawing. Application filed August 14, 1909. Serial No. 512,848.

*To all whom it may concern:*

Be it known that I, HUGO WOLFF, doctor of philosophy and chemist, a subject of the Grand Duke of Baden, residing at Ludwigshafen-on-the-Rhine, Germany, have invented new and useful Improvements in Green Anthracene Dyes and Processes of Making the Same, of which the following is a specification.

I have discovered that the benzanthronyl-1-amino-anthraquinon bodies which can be obtained by condensing 1-amino-anthraquinon compounds with halogenated benzanthron compounds which contain the halogen in the benzanthron ring, can be transformed, by treatment with condensing agents, into coloring matters which dye, from the vat, fast shades on vegetable fiber.

My new coloring matters possess the following generic properties. They are insoluble in water, but are soluble in nitrobenzene and in quinolin yielding greenish solutions, they are also soluble in concentrated sulfuric acid yielding from green to red solutions. In the solid state they possess from green to greenish black color. They are soluble in alkaline hydrosulfite yielding from blue, to violet-blue, vats, and these vats color cotton from blue, to violet-blue, shades, which shades on washing and drying become from green to bluish green.

The coloring matter which I wish to be understood as claiming specifically is that obtainable from benzanthronyl-1-amino-anthraquinon itself, and it yields a green solution in nitrobenzene, in quinolin and in concentrated sulfuric acid. It can be obtained in the form of a green-black powder, and yields a blue-violet vat in alkaline hydrosulfite. This vat colors cotton blue-violet shades, which shades on washing and drying are converted in a very fast green.

The following are examples of how my invention can be performed, but the invention is not confined to these examples. The parts are by weight, and the temperatures are given in degrees centigrade. The benzanthronyl-1-amino-anthraquinon named in Examples 1, 2, and 3, is obtainable by condensing 1-amino-anthraquinon with monochlor-benzanthron which has been produced by acting with chlorin on benzanthron in aqueous suspension, as described in Example 4 of the specification of British Letters Patent No. 20,837/06.

Example 1: Mix well together six parts of benzanthronyl-1-amino-anthraquinon and forty parts of caustic potash and, while stirring, heat the mixture slowly to from two hundred and forty, to two hundred and forty-five, degrees, and maintain it at this temperature for about fifteen minutes. When the melt is cold, boil it with water and precipitate the coloring matter from the solution by passing air through it. Filter off the coloring matter, which is a dark green paste. If this paste be dried, the coloring matter is obtained as a green-black powder which is practically insoluble in either water, alkalis, dilute acids, glacial acetic acid, or alcohol. It yields a green solution in either xylene, nitrobenzene, or quinolin, and, on re-crystallization from nitrobenzene, can be obtained in the form of small leaflets which yield a pure green solution in concentrated sulfuric acid. The coloring matter dissolves in alkaline hydrosulfite, yielding a blue-violet vat which colors vegetable fiber violet-blue, which shade, however, on washing and drying, is converted into a very fast green.

Example 2: Dissolve one hundred parts of potassium hydrate in eighty parts of absolute alcohol and, at a temperature of from one hundred and thirty, to one hundred and forty, degrees, add ten parts of benzanthronyl-1-amino-anthraquinon and heat the mixture for thirty minutes to from one hundred and fifty-five, to one hundred and sixty, degrees. If, when the melt is cold, it be treated in the manner described in the preceding Example 1, a similar product is obtained.

Example 3: Heat together, at about one hundred and thirty degrees, four parts of metallic sodium, twenty parts of absolute alcohol and two hundred parts of anhydrous anilin, until the sodium is completely converted into its alcoholate. Then add two parts of benzanthronyl-1-amino-anthraquinon, and boil the whole for thirty minutes. When the mixture is cold, filter off the coloring matter obtained and wash and dry it.

Example 4: Treat benzanthronyl-1-amino- 7-hydroxy-anthraquinon (obtainable from 1-amino-7-hydroxy-anthraquinon and the brom-benzanthron produced by acting with bromin on benzanthron in aqueous suspension) with alcoholic potash in the manner described in the preceding second example, until the formation of the coloring matter is complete. When the melt is cold, boil it with water and precipitate the coloring matter by passing air through the solution. On filtering off the coloring matter, washing it, and then boiling it with dilute hydrochloric acid, the coloring matter is obtained in the form of green flakes. The said coloring matter can be filtered off and either be retained for use in the condition of a dark green paste, or be dried, when a greenish black powder is obtained which is insoluble in either water, dilute acids, or most organic solvents. It is slightly soluble in hot dilute alkalis, the solution being greenish blue. The coloring matter is soluble in nitrobenzene and quinolin, the solution being green, or greenish. Cold concentrated sulfuric acid dissolves it, the solution being a fuchsin red. Upon adding boric acid to this solution and heating it, the color becomes brown-violet. The coloring matter yields a blue-violet vat with alkaline hydrosulfite. Such a vat colors vegetable fiber violet-blue shades which, upon washing and drying, become bluish green.

Now what I claim is:—

1. The process of producing coloring matter of the anthracene series by treating a benzanthronyl-1-amino-anthraquinon body with a condensing agent.

2. The process of producing coloring matter of the anthracene series by treating benzanthronyl-1-amino-anthraquinon with caustic potash.

3. As new articles of manufacture the coloring matters of the anthracene series which can be obtained by treating a benzanthronyl-1-amino-anthraquinon body with a condensing agent which coloring matters are insoluble in water, but are soluble in nitrobenzene and in quinolin yielding greenish solutions, are also soluble in concentrated sulfuric acid yielding from green to red solutions, in the solid state possess from green to greenish black color, are soluble in alkaline hydrosulfite yielding from blue to violet-blue vats, and which vats color cotton from blue to violet-blue shades, which shades on washing and drying become from green to bluish green.

4. As a new article of manufacture the coloring matter of the anthracene series which can be obtained by treating benzanthronyl-1-amino-anthraquinon with caustic potash, which coloring matter is insoluble in water, but yields a green solution in nitrobenzene, in quinolin and in concentrated sulfuric acid, which can be obtained in the form of a green-black powder, and yields a blue-violet vat in alkaline hydrosulfite, which vat colors cotton blue-violet shades, which shades on washing and drying are converted into a very fast green.

In testimony whereof I have hereunto set my hand in the presence of two subscribing witnesses.

HUGO WOLFF.

Witnesses:
J. ALEC. LLOYD,
ERNEST L. IVES.